(12) United States Patent
Isowaki et al.

(10) Patent No.: US 11,817,138 B2
(45) Date of Patent: Nov. 14, 2023

(54) OPERATING CONDITION DETERMINING DEVICE, MAGNETIC RECORDING / REPRODUCING DEVICE, AND MAGNETIC RECORDING/REPRODUCING SYSTEM

(71) Applicant: KABUSHIKI KAISHA TOSHIBA, Tokyo (JP)

(72) Inventors: Yousuke Isowaki, Yokohama (JP); Katsuya Sugawara, Kawasaki (JP); Kenichiro Yamada, Minato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/816,784

(22) Filed: Aug. 2, 2022

(65) Prior Publication Data
US 2023/0274763 A1 Aug. 31, 2023

(30) Foreign Application Priority Data
Feb. 28, 2022 (JP) ................... 2022-029044

(51) Int. Cl.
| G11B 33/08 | (2006.01) |
| G11B 5/596 | (2006.01) |
| G06N 3/02 | (2006.01) |
| G11B 5/012 | (2006.01) |
| G06F 18/214 | (2023.01) |

(52) U.S. Cl.
CPC ........ *G11B 5/59688* (2013.01); *G06F 18/214* (2023.01); *G06N 3/02* (2013.01); *G11B 5/012* (2013.01)

(58) Field of Classification Search
CPC ..... G11B 33/08; G11B 33/14; G11B 33/1406; G11B 33/1446; G11B 5/54
USPC .................................................. 360/75, 97.19
See application file for complete search history.

(56) References Cited

U.S. PATENT DOCUMENTS

| 6,314,377 B1 * | 11/2001 | Ottesen | G11B 33/125 702/56 |
| 10,366,718 B1 | 7/2019 | Supino | |
| 2001/0052035 A1 * | 12/2001 | Singer | G11B 5/5556 710/5 |

* cited by examiner

*Primary Examiner* — Nabil Z Hindi
(74) *Attorney, Agent, or Firm* — Oblon, McClelland, Maier & Neustadt, L.L.P.

(57) ABSTRACT

According to one embodiment, an operating condition determining device includes a memory, and a processor. The memory is configured to store a plurality of classifications relating to information corresponding to a vibration state of a magnetic recording/reproducing device, and a plurality of setting parameter sets relating to an operation of the magnetic recording/reproducing device. The setting parameter sets correspond to the classifications. The processer is configured to acquire a first data. The first data includes information of the vibration state of the magnetic recording/reproducing device. The information is measured. The processer is configured to acquire one of the setting parameter sets from the memory. The one of the setting parameter sets corresponds to one of the classifications corresponding to the first data.

20 Claims, 3 Drawing Sheets

OPERATING CONDITION DETERMINING DEVICE, MAGNETIC RECORDING / REPRODUCING DEVICE, AND MAGNETIC RECORDING/REPRODUCING SYSTEM

CROSS-REFERENCE TO RELATED APPLICATIONS

This application is based upon and claims the benefit of priority from Japanese Patent Application No. 2022-029044, filed on Feb. 28, 2022; the entire contents of which are incorporated herein by reference.

FIELD

Embodiments of the invention generally relate to an operating condition determining device, a magnetic recording/reproducing device, and a magnetic recording/reproducing system.

BACKGROUND

For example, by appropriately controlling the operating conditions of the magnetic recording/reproducing device, more stable recording and reproducing become possible.

DETAILED DESCRIPTION

Figure 1:
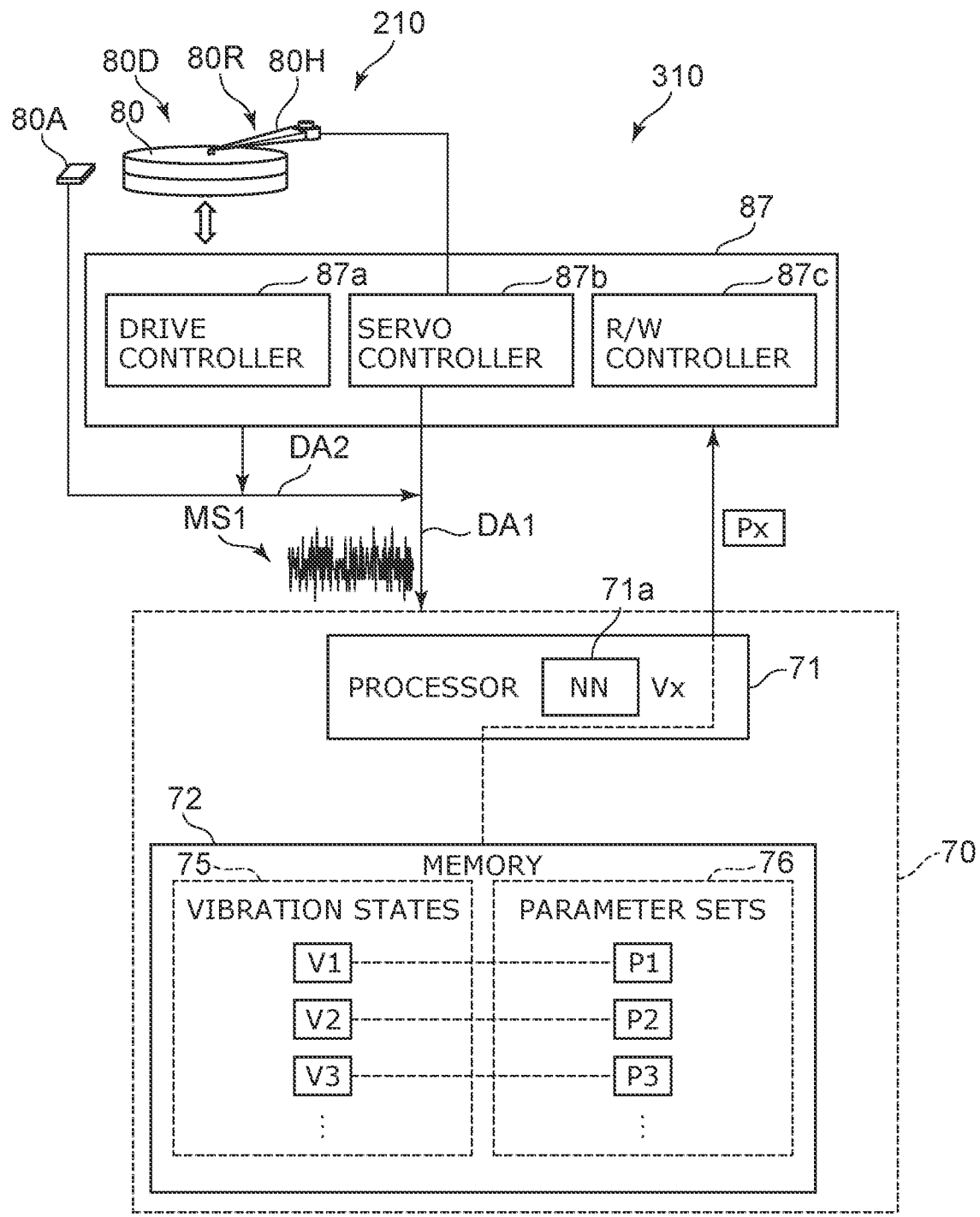
FIG. 1 is a schematic diagram illustrating an operating condition determining device and a magnetic recording/reproducing device according to a first embodiment.

According to one embodiment, an operating condition determining device includes a memory, and a processer. The memory is configured to store a plurality of classifications relating to information corresponding to a vibration state of a magnetic recording/reproducing device, and a plurality of setting parameter sets relating to an operation of the magnetic recording/reproducing device. The setting parameter sets correspond to the classifications. The processer is configured to acquire a first data. The first data includes information of the vibration state of the magnetic recording/reproducing device. The information is measured. The processer is configured to acquire one of the setting parameter sets from the memory. The one of the setting parameter sets corresponds to one of the classifications corresponding to the first data.

According to one embodiment, a magnetic recording/reproducing system includes the operating condition determining device described above.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIG. 1 is a schematic diagram illustrating an operating condition determining device and a magnetic recording/reproducing device according to a first embodiment.

As shown in FIG. 1, a magnetic recording/reproducing device 210 according to the embodiment includes an operating condition determining device 70 and a recording portion 80D. The recording portion 80D includes a magnetic recording medium 80. The magnetic recording medium 80 may include, for example, a magnetic disk (HDD: Hard Disk Drive) or the like. The recording portion 80D may include, for example, an SSD (Solid State Drive). The recording portion 80D may include, for example, a recording/reproducing portion 80R. The recording/reproducing portion 80R includes, for example, a magnetic head 80H. Information is recorded on the magnetic recording medium 80 by the recording/reproducing portion 80R (the magnetic head 80H). The information recorded on the magnetic recording medium 80 is reproduced by the recording/reproducing portion 80R (magnetic head 80H).

The magnetic recording/reproducing device 210 includes an operation controller 87. The operation controller 87 includes, for example, a drive controller 87a, a servo controller 87b, and an R/W controller 87c (read/write controller). The drive controller 87a controls, for example, the mechanical operation of the magnetic recording medium 80 and the magnetic head 80H. For example, the position of the magnetic head 80H with respect to the magnetic recording medium 80 is servo-controlled by the servo controller 87b. For example, recording conditions (recording current, etc.), reproducing conditions, and the like are controlled by the R/W controller 87c.

The operating condition determining device 70 can determine various operation parameters in the operation controller 87, for example. The control operation of the operation controller 87 is performed based on various operation parameters determined by the operating condition determining device 70.

The operating condition determining device 70 includes a processor 71 and a memory 72. The memory 72 can store a plurality of classifications 75 and a plurality of setting parameter sets 76. The plurality of classifications 75 are classifications relating to information corresponding to vibration state of the magnetic recording/reproducing device 210. For example, the vibration state of the magnetic recording/reproducing device 210 is affected by vibration of various other devices (such as another recording device or a cooling fan). Alternatively, the vibration state of the magnetic recording/reproducing device 210 is affected by vibration caused by the rotation of the magnetic recording medium 80 included in the magnetic recording/reproducing device 210. Such a plurality of vibration states are classified into a plurality of categories.

In one example, the servo controller 87b included in the magnetic recording/reproducing device 210 follows the vibration state and performs servo control so that the magnetic head 80H is at a target position. The servo signal of the servo controller 87b depends on the vibration state. The servo signal of the servo controller 87b is information corresponding to the vibration state. The servo signal may include, for example, PES (Position Error Signal).

As described above, the information corresponding to the vibration state of the magnetic recording/reproducing device 210 may include PES (Position Error Signal). PES can be obtained from the servo controller 87b.

Such information (for example, PES) corresponding to the vibration state of the magnetic recording/reproducing device 210 is classified into a plurality of categories, and the plurality of classifications 75 are determined. The plurality of classifications 75 include, for example, the first classification V1, the second classification V2, the third classification V3, and the like. In embodiments, the number of plurality of classifications 75 is arbitrary.

The plurality of setting parameter sets 76 are setting parameters relating to the operation of the magnetic recording/reproducing device 210. The plurality of setting parameter sets 76 includes, for example, a first setting parameter set P1, a second setting parameter set P2, a third setting parameter set P3, and the like. In embodiments, the number of setting parameter sets 76 is arbitrary.

The plurality of setting parameter sets 76 are determined according to the plurality of classifications 75. For example, the first setting parameter set P1 is defined corresponding to the first classification V1 regarding the vibration. The second setting parameter set P2 is defined corresponding to the second classification V2 regarding the vibration. The third setting parameter set P3 is defined corresponding to the third classification V3 regarding the vibration. The plurality of setting parameter sets 76 are defined so that more appropriate operations can be performed in each of the plurality of corresponding classifications 75.

For example, in the first setting parameter set P1, the servo-related parameter is an A1 value, the signal processing parameter is a B1 value, and the R/W parameter is a C1 value. On the other hand, in the second setting parameter set P2, the HDI (Head Disk Interface) related parameter is a D2 value, the head related parameter is an E2 value, and the mechanical parameter is a F2 value. As described above, each of the plurality of setting parameter sets 76 includes various parameters relating to the operation of the magnetic recording/reproducing device 210.

The plurality of classifications 75 and the plurality of setting parameter sets 76 corresponding to the plurality of classifications 75 are associated and stored in the memory 72.

As shown in FIG. 1, the processor 71 acquires first data DA1. The first data DA1 may be obtained from, for example, the operation controller 87 included in the magnetic recording/reproducing device 210. For example, the first data DA1 includes information MS1 measured with respect to the vibration state of the magnetic recording/reproducing device 210. For example, PES can be obtained from the servo controller 87b. The PES corresponds to the information MS1 measured with respect to the vibrational state. Thus, the first data DA1 may include PES.

The processor 71 determines, for example, one of the plurality of classifications 75 (classification Vx) corresponding to the acquired first data DA1. Then, one of the plurality of setting parameter sets 76 (setting parameter set Px) corresponding to the determined one (classification Vx) of the plurality of classifications 75 can be acquired from the memory 72.

The processor 71 can supply the setting parameter set Px acquired from the memory 72 to the operation controller 87. The operation controller 87 performs various control operations based on the setting parameter set Px. The operation of the magnetic recording/reproducing device 210 is controlled by an appropriate operating condition (the setting parameter set Px) according to the measured information MS1. As a result, the magnetic recording/reproducing device 210 can be operated under more appropriate operating conditions. More appropriate operation can be performed.

As described above, in the embodiment, the processor 71 can acquire one of the plurality of setting parameter sets 76 from the memory 72. The above one of the plurality of setting parameter sets 76 obtained from the memory 72 corresponds to one of the plurality of classifications 75 corresponding to the first data DA1 including the measured information MS1. According to the embodiment, it is possible to provide an operating condition determining device capable of determining a more appropriate operating condition.

For example, there is a reference example for finding the optimum operating conditions by calculation based on PES. In this case, the calculation based on the measurement result of PES is performed. Therefore, it takes a long time to derive the operating conditions. Time delay is likely to occur.

On the other hand, in the embodiment, for example, PES (example of the first data DA1 regarding the vibration state) is obtained, and one of the plurality of classifications 75 (classification Vx) corresponding to the PES is derived. That is, it is not necessary to calculate appropriate operating conditions based on PES. It is only necessary to acquire the setting parameter set Px corresponding to one of the plurality of classifications 75 (the classification Vx) from the memory 72. As a result, the time for determining the operating conditions is short. Since the time is short, for example, even when the vibration state changes, it is possible to provide appropriate operating conditions by following the time change. In the embodiment, the circuit for calculation is also simplified.

In the embodiment, one of the plurality of setting parameter sets 76 (the setting parameter set Px) determined may include, for example, at least one of parameters relating to the recording current of the magnetic recording/reproducing device 210, parameters relating to the reproducing conditions of the magnetic recording/reproducing device 210, parameters relating to the track refresh threshold value of the magnetic recording/reproducing device 210, parameters relating to the floating state of the magnetic head 80H of the magnetic recording/reproducing device 210, parameters relating to seek control of the magnetic recording/reproducing device 210, or parameters relating to the signal processing conditions of the magnetic recording/reproducing device 210.

In the embodiment, the recording current may be controlled (for example, changed) by, for example, the setting parameter set Px determined based on the measured information MS1 (the first data DA1). In this case, for example, SOVA BER (soft-output viterbi algorithm bit error rate) can be improved.

For example, the floating state of the magnetic head 80H may be controlled (for example, changed) by the setting parameter set Px determined based on the measured information MS1 (the first data DA1). In this case, for example, the reliability of the device is improved. The levitation state includes, for example, the distance between the magnetic recording medium 80 and the magnetic head 80H.

For example, the seek control operation may be controlled (for example, changed) by the setting parameter set Px determined based on the measured information MS1 (the first data DA1). In this case, for example, I/O (input/output) performance is improved.

As described above, the processor 71 can determine one of the plurality of classifications 75 (the classification Vx) corresponding to the first data DA1. The processor 71 can acquire one of the plurality of setting parameter sets 76 (the setting parameter set Px) corresponding to one of the determined plurality of classifications 75 (the classification Vx) from the memory 72.

As shown in FIG. 1, in the embodiment, the determining one of the plurality of classifications 75 (the classification Vx) may be performed out by processing the information including the first data DA1 by a neural network (NN) 71a. In the neural network 71a, machine learning is performed using information including the first data DA1 and the plurality of classifications 75 regarding information corresponding to the vibration state of the magnetic recording/reproducing device 210 as teacher data. By the processing by the neural network 71a, one of the plurality of classifications 75 (the classification Vx) corresponding to the first data DA1 can be efficiently determined with high accuracy.

As shown in FIG. 1, the information including the first data DA1 may include second data DA2 relating to the magnetic recording/reproducing device 210. The second data DA2 may include acceleration information obtained by the acceleration sensor 80A provided in the magnetic recording/reproducing device 210. The second data DA2 may include track refresh frequency information in the magnetic recording/reproducing device 210. The second data DA2 may include write error frequency information or read error frequency information in the magnetic recording/reproducing device 210. By using the second data DA2 as auxiliary information, one of the plurality of classifications 75 (the classification Vx) corresponding to the information MS1 measured with respect to the vibration state can be derived more accurately. "Write" corresponds to "recording". "Read" corresponds to "reproducing".

Figure 2:
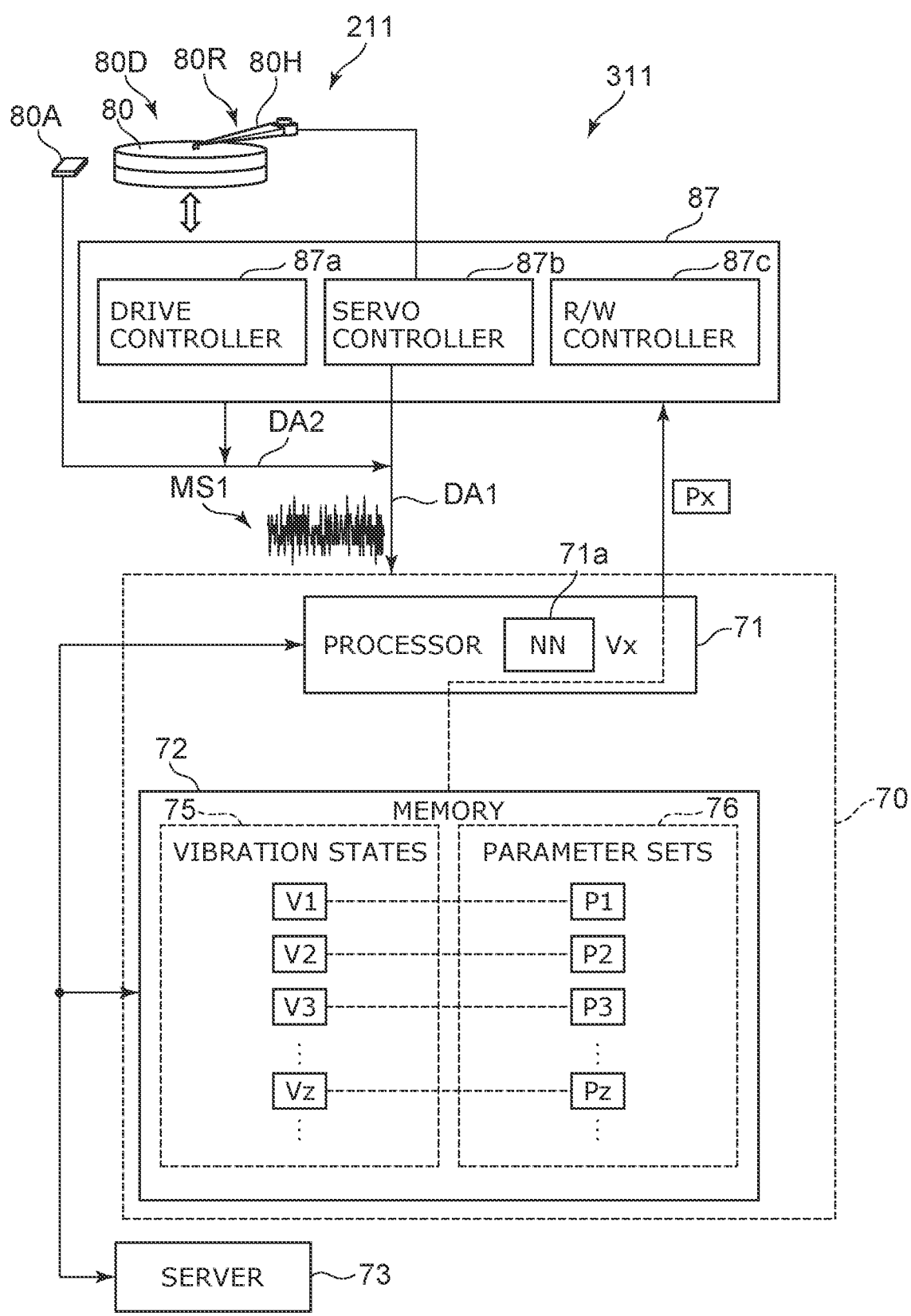
FIG. 2 is a schematic diagram illustrating the operating condition determining device and the magnetic recording/reproducing device according to the first embodiment.

FIG. 2 is a schematic diagram illustrating the operating condition determining device and the magnetic recording/reproducing device according to the first embodiment.

As shown in FIG. 2, in the operating condition determining device 70, the memory 72 may be able to communicate with a server 73. The processor 71 may be able to communicate with the server 73. For example, the memory 72 may be able to communicate with the server 73 via the processer 71. Any wired or wireless method can be applied to the communication.

The memory 72 may be able to update at least one of the plurality of classifications 75 or the plurality of setting parameter sets 76. For example, the server 73 may perform the update. For example, the internal parameters of the model of the neural network 71a may be updatable. For example, the plurality of classifications 75 may be updatable in response to changes in the internal parameters of the model of the neural network 71a.

The magnetic recording/reproducing device 210 (see FIG. 1) or the magnetic recording/reproducing device 211 (see FIG. 2) according to the embodiment includes the above-mentioned operating condition determining device 70. The magnetic recording/reproducing device 210 or 211 includes the magnetic recording medium 80, the magnetic head 80H, and the operation controller 87. The magnetic head 80H can record and reproduce information on the magnetic recording medium 80.

The operation controller 87 can control the operation of at least one of the magnetic recording medium 80 or the magnetic head 80H based on the above one of the plurality of setting parameter sets 76 (the setting parameter set Px). More appropriate operation corresponding to the vibration state can be performed.

Second Embodiment

The magnetic recording/reproducing system according to the second embodiment includes, for example, a magnetic recording/reproducing system 310 (see FIG. 1) or a magnetic recording/reproducing system 311 (see FIG. 2). Hereinafter, the magnetic recording/reproducing system 311 will be described.

The magnetic recording/reproducing system 311 includes the above-mentioned operating condition determining device 70. The magnetic recording/reproducing system 311 may include the server 73. The server 73 may be able to update at least one of the plurality of classifications 75 or the plurality of setting parameter sets 76 stored in the memory 72.

The magnetic recording/reproducing system 311 may include a plurality of magnetic recording/reproducing devices 211. The processor 71 may acquire one of the plurality of setting parameter sets 76 (the setting parameter set P1) from the memory 72, and may supply it to the plurality of magnetic recording/reproducing devices 211.

In the magnetic recording/reproducing system 311, the processor 71 may be machine-learnable. Machine learning may be performed using, for example, information including the first data DA1 and the plurality of classifications 75 relating to information corresponding to vibration states of the plurality of magnetic recording/reproducing devices 211 as teacher data. Machine learning may be performed, for example, via the server 73.

In the magnetic recording/reproducing system 310 or 311 according to the embodiment, a plurality of elements (for example, the processor 71 and the memory 72) may be provided in different places. Information may be transmitted and received by any communication method. For example, a plurality of parts (for example, a plurality of neural networks) included in the processor 71 may be provided at different places. In one example, the processor 71 is provided in the magnetic recording/reproducing device, and the memory 72 is provided in the server 73. Communication may be performed between the magnetic recording/reproducing device and the server 73 by any method.

Figure 3:
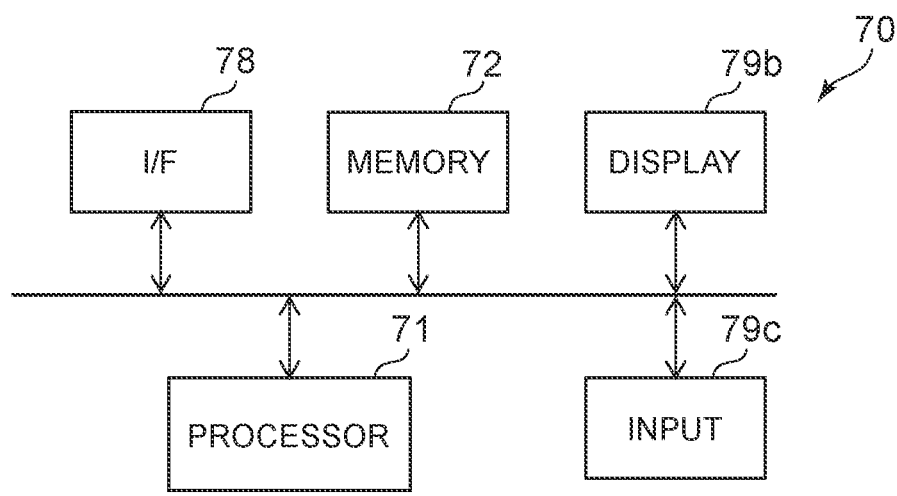
FIG. 3 is a schematic diagram illustrating the operating condition determining device according to the embodiment.

FIG. 3 is a schematic diagram illustrating the operating condition determining device according to the embodiment.

As shown in FIG. 3, the operating condition determining device 70 includes the processor 71 and the memory 72. The processor 71 is, for example, an electric circuit. The memory 72 may include, for example, at least one of a ROM (Read Only Memory) or a RAM (Random Access Memory). As the memory 72, for example, a part of the recording portion 80D may be used.

The operating condition determining device 70 may include a display 79b, an input device 79c, and the like. The display 79b may include various displays. The input device 79c includes, for example, a device having an operation function (for example, a keyboard, a mouse, a touch input panel, a voice recognition input device, or the like).

The plurality of elements included in the operating condition determining device 70 can communicate with each other by at least one of wireless or wired methods. The locations where the plurality of elements included in the operating condition determining device 70 are provided may be different from each other. As the operating condition determining device 70, for example, a general-purpose computer may be used. As the operating condition determining device 70, for example, a plurality of computers connected to each other may be used. A dedicated circuit may be used as at least a part of the operating condition determining device 70 (for example, the processor 71). As the operating condition determining device 70, for example, a plurality of circuits connected to each other may be used.

The embodiments may include a program. The program causes a computer (operating condition determining device 70) to perform the above operation. The embodiment may include a memory medium in which the above program is stored.

The embodiments may include the following configurations (for example, technical proposals).

(Configuration 1)

An operating condition determining device, comprising:
a memory; and
a processor,
the memory being configured to store a plurality of classifications relating to information corresponding to a vibration state of a magnetic recording/reproducing device, and a plurality of setting parameter sets relating to an operation of the magnetic recording/reproducing device, the setting parameter sets correspond to the classifications,
the processor being configured to acquire a first data, the first data including information of the vibration state of the magnetic recording/reproducing device, the information being measured, and
the processor being configured to acquire one of the setting parameter sets from the memory, the one of the setting parameter sets corresponds to one of the classifications corresponding to the first data.

(Configuration 2)

The device according to Configuration 1, wherein the first data includes PES (Position Error Signal).

(Configuration 3)

The device according to Configuration 2, wherein the PES is obtained from a servo controller included in the magnetic recording/reproducing device.

(Configuration 4)

The device according to any one of Configurations 1-3, wherein
the processor is configured to determine one of the classifications corresponding to the first data, and
the processor is configured to acquire the one of the setting parameter sets corresponding to the one of the classifications being determined from the memory.

(Configuration 5)

The device according to Configuration 4, wherein the determining the one of the classifications is performed by processing information including the first data with a neural network.

(Configuration 6)

The device according to Configuration 5, wherein the neural network is machine-learned using information including the first data, and the classifications of the information corresponding to the vibration state of the magnetic recording/reproducing device as teacher data.

(Configuration 7)

The device according to Configuration 5 or 6, wherein
an internal parameter of a model of the neural network is updatable, and
the classifications are updatable.

(Configuration 8)

The device according to any one of Configurations 1-7, wherein the information including the first data includes a second data relating to the magnetic recording/reproducing device.

(Configuration 9)

The device according to Configuration 8, wherein
the second data includes at least one of acceleration information obtained by an acceleration sensor provided in the magnetic recording/reproducing device, track refresh frequency information in the magnetic recording/reproducing device, write error frequency information in the magnetic recording/reproducing device, or read error frequency information in the magnetic recording/reproducing device.

(Configuration 10)

The device according to any one of Configurations 1-9, wherein the one of the setting parameter sets includes:
a parameter relating to a recording current of the magnetic recording/reproducing device,
a parameter relating to a reproducing condition of the magnetic recording/reproducing device,
a parameter relating to a track refresh threshold value of the magnetic recording/reproducing device,
a parameter relating to a floating state of the magnetic head of the magnetic recording/reproducing device,
a parameter relating to a seek control of the magnetic recording/reproducing device, or
a parameter relating to signal processing conditions of the magnetic recording/reproducing device.

(Configuration 11)

The device according to any one of Configurations 1-10, wherein the memory is configured to update at least one of the classifications or the setting parameter sets.

(Configuration 12)

The device according to Configuration 11, wherein
the memory is configured to communicate with a server, and
the server is configured to perform the update.

(Configuration 13)

The device according to any one of Configurations 1-11, wherein the processor and the memory are configured to communicate with each other via the server.

(Configuration 14)

The device according to any one of Configurations 1-13, wherein the processor is configured to supply the one of the setting parameter sets acquired from the memory to an operation controller included in the magnetic recording/reproducing device.

(Configuration 15)

A magnetic recording/reproducing device, comprising the operating condition determining device according to any one of Configurations 1-13.

(Configuration 16)

The magnetic recording/reproducing device according to Configuration 15, further comprising:
a magnetic recording medium;
a magnetic head configured to record and reproduce information on the magnetic recording medium; and
an operation controller,
the operation controller is configured to control an operation of at least one of the magnetic recording medium or the magnetic head based on the one of the setting parameter sets.

(Configuration 17)

A magnetic recording/reproducing system, comprising the operating condition determining device according to any one of Configurations 1-10.

(Configuration 18)

The system according to Configuration 17, further comprising a server,
the server being configured to update at least one of the classifications and the setting parameter sets stored in the memory.

(Configuration 19)

The system according to Configuration 17 or 18, further comprising a plurality of the magnetic recording/reproducing devices, the processer being configured to acquire the one of the setting parameter sets from the memory regarding the magnetic recording/reproducing devices, and to supply the magnetic recording/reproducing devices with the one of the setting parameter sets.

(Configuration 20)

The system according to Configuration 17 or 18, further comprising a plurality of the magnetic recording/reproducing devices, the processer being configured to perform machine learning on the magnetic recording/reproducing devices by using the information including the first data and the classifications regarding the information corresponding to the vibration state as teacher data.

According to the embodiment, it is possible to provide an operating condition determining device, a magnetic recording/reproducing device, and a magnetic recording/reproducing system configured to determine more appropriate operating conditions.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in operating condition determining devices, magnetic recording/reproducing devices, and magnetic recording/reproducing systems such as controller, processer, recording portion, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all operating condition determining devices, magnetic recording/reproducing devices, and magnetic recording/reproducing systems practicable by an appropriate design modification by one skilled in the art based on the operating condition determining devices, the magnetic recording/reproducing devices, and the magnetic recording/reproducing systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An operating condition determining device, comprising:
   a memory; and
   a processor,
   the memory being configured to store a plurality of classifications relating to information corresponding to a vibration state of a magnetic recording/reproducing device, and a plurality of setting parameter sets relating to an operation of the magnetic recording/reproducing device, the setting parameter sets correspond to the classifications,
   the processor being configured to acquire a first data, the first data including information of the vibration state of the magnetic recording/reproducing device, the information being measured, and
   the processor being configured to acquire one of the setting parameter sets from the memory, the one of the setting parameter sets corresponds to one of the classifications corresponding to the first data,
   wherein the information including the first data includes a second data relating to the magnetic recording/reproducing device.

2. The device according to claim 1, wherein the first data includes PES (Position Error Signal).

3. The device according to claim 2, wherein the PES is obtained from a servo controller included in the magnetic recording/reproducing device.

4. The device according to claim 1, wherein
   the processor is configured to determine one of the classifications corresponding to the first data, and
   the processor is configured to acquire the one of the setting parameter sets corresponding to the one of the classifications being determined from the memory.

5. The device according to claim 4, wherein the determining the one of the classifications is performed by processing information including the first data with a neural network.

6. The device according to claim 5, wherein the neural network is machine-learned using information including the first data, and the classifications of the information corresponding to the vibration state of the magnetic recording/reproducing device as teacher data.

7. The device according to claim 5, wherein
   an internal parameter of a model of the neural network is updatable, and
   the classifications are updatable.

8. The device according to claim 1, wherein
   the second data includes at least one of acceleration information obtained by an acceleration sensor provided in the magnetic recording/reproducing device, track refresh frequency information in the magnetic recording/reproducing device, write error frequency information in the magnetic recording/reproducing device, or read error frequency information in the magnetic recording/reproducing device.

9. The device according to claim 1, wherein the one of the setting parameter sets includes:
   a parameter relating to a recording current of the magnetic recording/reproducing device,
   a parameter relating to a reproducing condition of the magnetic recording/reproducing device,
   a parameter relating to a track refresh threshold value of the magnetic recording/reproducing device,
   a parameter relating to a floating state of the magnetic head of the magnetic recording/reproducing device,
   a parameter relating to a seek control of the magnetic recording/reproducing device, or
   a parameter relating to signal processing conditions of the magnetic recording/reproducing device.

10. The device according to claim 1, wherein the memory is configured to update at least one of the classifications or the setting parameter sets.

11. The device according to claim 10, wherein
the memory is configured to communicate with a server, and
the server is configured to perform the update.

12. The device according to claim 1, wherein the processer and the memory are configured to communicate with each other via the server.

13. The device according to claim 1, wherein the processer is configured to supply the one of the setting parameter sets acquired from the memory to an operation controller included in the magnetic recording/reproducing device.

14. A magnetic recording/reproducing device, comprising the operating condition determining device according to claim 1.

15. The device according to claim 14, further comprising:
a magnetic recording medium;
a magnetic head configured to record and reproduce information on the magnetic recording medium; and
an operation controller,
the operation controller being configured to control an operation of at least one of the magnetic recording medium or the magnetic head based on the one of the setting parameter sets.

16. A magnetic recording/reproducing system, comprising:
the operating condition determining device according to claim 1; and
a server,
the server being configured to update at least one of the classifications and the setting parameter sets stored in the memory.

17. The system according to claim 16, further comprising a plurality of the magnetic recording/reproducing devices,
the processer being configured to acquire the one of the setting parameter sets from the memory regarding the magnetic recording/reproducing devices, and to supply the magnetic recording/reproducing devices with the one of the setting parameter sets.

18. The system according to claim 16, further comprising a plurality of the magnetic recording/reproducing devices,
the processer being configured to perform machine learning on the magnetic recording/reproducing devices by using the information including the first data and the classifications regarding the information corresponding to the vibration state as teacher data.

19. An operating condition determining device, comprising:
a memory; and
a processer,
the memory being configured to store a plurality of classifications relating to information corresponding to a vibration state of a magnetic recording/reproducing device, and a plurality of setting parameter sets relating to an operation of the magnetic recording/reproducing device, the setting parameter sets correspond to the classifications,
the processer being configured to acquire a first data, the first data including information of the vibration state of the magnetic recording/reproducing device, the information being measured, and
the processer being configured to acquire one of the setting parameter sets from the memory, the one of the setting parameter sets corresponds to one of the classifications corresponding to the first data,
wherein
the processer is configured to determine one of the classifications corresponding to the first data,
the processer is configured to acquire the one of the setting parameter sets corresponding to the one of the classifications being determined from the memory, and
the determining the one of the classifications is performed by processing information including the first data with a neural network.

20. An operating condition determining device, comprising:
a memory; and
a processer,
the memory being configured to store a plurality of classifications relating to information corresponding to a vibration state of a magnetic recording/reproducing device, and a plurality of setting parameter sets relating to an operation of the magnetic recording/reproducing device, the setting parameter sets correspond to the classifications,
the processer being configured to acquire a first data, the first data including information of the vibration state of the magnetic recording/reproducing device, the information being measured, and
the processer being configured to acquire one of the setting parameter sets from the memory, the one of the setting parameter sets corresponds to one of the classifications corresponding to the first data,
wherein the memory is configured to update at least one of the classifications or the setting parameter sets,
the memory is configured to communicate with a server, and
the server is configured to perform the update.

* * * * *